United States Patent Office 3,436,381
Patented Apr. 1, 1969

3,436,381
POLYMERIZABLE CARBAMATES CONTAINING NITROGEN AND FLUORINE
Samuel F. Reed, Jr., Huntsville, Ala., assignor to Rohm & Haas Company, Philadelphia, Pa., a corporation of Delaware
No Drawing. Filed Oct. 24, 1961, Ser. No. 147,713
Int. Cl. C08f 3/90, 15/02; C07c 125/04
U.S. Cl. 260—86.1                    10 Claims This invention concerns polymerizable monomeric carbamates and the polymers and copolymers formed by the polymerization thereof. More particularly, it concerns monomeric carbamates which, when polymerized or copolymerized or plasticized, are valuable as plastics and, in solution, as protective coatings. Specifically, it concerns polymerizable carbamates containing nitrogen and fluorine and the polymers and copolymers thereof.

Fluorine-containing monomers which would yield polymers with good physical properties would be most desirable. Particularly desirable would be polymerizable fluorine-containing compounds which could be copolymerized with other monoethylenically unsaturated monomers, thus producing copolymers with a wide range of properties. These requirements are fullfilled by the compounds of the present invention.

It has been found that polymerizable compounds with very desirable physical and chemical properties result when monoethylenically unsaturated isocyanates are reacted with alcohols containing high amounts of fluorine and nitrogen.

The compounds of the present invention can be represented by the following formula:

$$R-NH-\overset{O}{\underset{\|}{C}}-OR^1$$

in which R is vinyl, acryloyl, methacryloyl or ethacryloyl, and $R^1$ is selected from the group consisting of

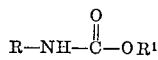

in which $n$ is an integer from 1 to 5,

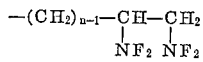

and

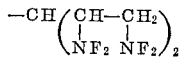

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

The monomers of the present invention provide means for intrducing difluoramino groups into polymers. By copolymerizing with other ethylenically unsaturated polymerizable monomers, the nitrogen and fluorine contents of the copolymers can be readily controlled. The polymers and copolymers of the present invention are useful as oil-resistant coatings.

The monomers of the present invention are prepared by the reaction of isocyanates of the formula

R—NCO with alcohols of the following formulas:

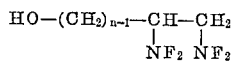

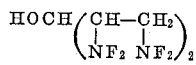

and

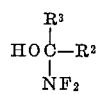

in which R, $R^1$, $R^2$ and $R^3$ and $n$ are as hereinbefore set forth.

Suitable isocyanates containing a polymerizable vinyl group include vinyl isocyanate, acryloyl isocyanate, methacryloyl and ethacryloyl isocyanates. Acryloyl isocyanate was prepared using acryloyl chloride and silver isocyanate according to the method of Lieser and Kemmner (Chem. Berg. 84, 4 (1951)) and the process is incorporated herein by reference. The methacryloyl and ethacryloyl isocyanates were prepared in a similar fashion. Vinyl isocyanate was prepared by the method of Hart (R. Hart, Bull. Soc. Chem. Belg., 65, 291 (1956)), and the process is incorporated herein by reference.

It is preferred to add a polymerization inhibitor to the reaction mixture during the preparation of the monomer. Such polymerization inhibitors are well-known, and typical are hydroquinone, quinone, tert-butyl-catechol, etc. 0.05% to 0.2% on the weight of the reaction mixture is employed. Diphenyl picrylhydrazyl was found to be particularly effective as a polymerization inhibitor.

The carbinols of the formula

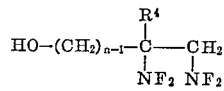

in which $n$ is an integer from 1 to 5, are prepared by reacting alkenyl esters with $N_2F_4$. Thus, allyl trifluoroacetate is reacted with tetrafluorohydrazine, $N_2F_4$, to give the adduct which is then transesterified with methanol to give 2,3-bis(difluoramino)propanol-1. In a similar manner, vinyl trifluoroacetate by the same series of reactions, gives 1,2-bis(difluoramino)ethanol.

Typical of the carbinols of this type are:

1,2-bis(difluoramino)ethanol,
2,3-bis(difluoramino)-2-methyl-propanol-1,
2,3-bis(difluoramino)butanol-1,
1,2-bis(difluoramino)pentanol-3, and
5,6-bis(difluoramino)hexanol-3.

The carbinol of the formula

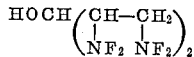

is prepared by the addition of $N_2F_4$ to double bonds followed by further reaction. Thus, divinyl carbinol is esterified by reacting with trifluoroacetic anhydride, the resulting ester is reacted with two moles $N_2F_4$ and the adduct is transesterified with methanol to produce bis(1, 2-difluoraminoethyl)carbinol, which can also be named 1,2,4,5-tetrakis(difluoramino)pentanol-3.

The carbinols of the formula

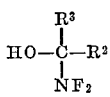

are prepared by reacting compounds of the formula

with difluoramine, $HNF_2$, $R^2$ and $R^3$ are as hereinbefore described.

Typical of these alcohols are: $\alpha$-difluoraminomethanol, $\alpha$-difluoraminoethanol, and $\alpha$-difluoraminobutanol.

The carbamates of the present invention are prepared by adding the fluorine-containing alcohols to the isocyanate with or without a catalyst, such as ferric acetyl acetonate. The order of addition is not critical, but the reaction is exothermic, and portion-wise addition of one component to the other is generally required in order to control the temperature of the reaction mixture. However, external cooling may also be used.

The reaction temperature as such is not critical in that the reaction will occur over a very wide temperature range. Thus, the desired products have been obtained over a temperature range of about −60° C. to about 40° C. There are several factors, however, which govern the choice of reaction temperatures. At very low temperatures, the solubility of the reaction products in the solvent is substantially decreased, the products precipitate, and agitation difficulties are encountered. At temperatures near the upper temperature range, the proportionwise addition must be very slow in order to control the exothermic heat. A preferred temperature range is from −10° to 25° C. Furthermore, since both the isocyanates and the carbamates produced therefrom are polymerizable, it is desirable to maintain as low a temperature as is commensurate with a practical reaction rate.

Because the isocyanates react readily with water, the reaction is conducted under anhydrous conditions, i.e. this means that there should not be more than 5 to 10 p.p.m. total of water present in all the reactants since any water present will be removed by reaction with the isocyanate and result in loss of reactants. The reactants and the solvent, if one is employed, are carefully dried before use.

Although complete freedom from oxygen during the reaction period is not required, the preferred embodiment employs substantially oxygen-free conditions.

The molar ratios of the alcohol to the isocyanate can be varied and still obtain the desired product. Thus, the reaction of isocyanate and alcohol is quantitative at 1:1 ratio, and since any excess of either reagent must be removed during the purification of the product, a 1:1 ratio of alcohol to isocyanate represents the preferred embodiment.

The reaction between the alcohol and the isocyanate can be carried out in the absence of solvents, but difficulties are encountered with agitation and in dissipating the exothermic heat of reaction. The use of solvents represents the preferred embodiment since the solvents facilitate agitation and heat dissipation. Any inert solvent, i.e. solvents which do not react with the reactants or the reaction product, can be satisfactorily used. Thus, hydrocarbons such as benzene and toluene and chlorinated solvents, such as chloroform, methylene chloride, are satisfactory. Acetonitrile can also be used. In the case of the solvents set forth hereinbefore, the reaction products precipitate as formed. Enough solvent is employed to give a readily stirrable reaction mixture. Because the solvent is required only for its physical effects, the ratio of solvent volume to the volume of the other reactants is not critical. Using one gram mole each of alcohol and isocyanate, however, 1 to 2 liters of solvent will accomplish the desired results.

The properties of the carbamates of the present invention can be altered by copolymerizing with comonomers. Suitable comonomers include methyl acrylate, ethyl acrylate, butyl acrylate, 2-ethylhexyl acrylate, and the higher alkyl esters of methacrylic and ethacrylic acids. Esters of this type include the butyl, 2-ethylhexyl, decyl and lauryl esters of methacrylic and ethacrylic acids.

Other suitable comonomers include vinyl ethers, vinyl esters, such as vinyl acetate, vinyl stearate; styrene, vinyltoluene, vinyl naphthalene, acrylonitrile, methacrylonitrile and mixtures thereof.

The polymeric carbamates of the present invention are tough elastic polymers, and, as such, are suitable as binders in compositions such as caulking compounds and the like. When employed in solvent for the application of coatings which inhibit a high degree of oil and water-resistance it is frequently desirable to copolymerize with another monomer which will impart hardness, mar- and abrasion-resistance to the resulting film. Typical of such monomers are methyl methacrylate, styrene, vinyltoluene, acrylonitrile and methacrylonitrile. For compositions such as pressure sensitive adhesives, polymers even softer than the polymers of the present invention are required, and these polymers can be obtained by copolymerizing the monomers of the present invention with monomers which of themselves give soft polymers. Typical of such monomers are the butyl, 2-ethylhexyl, decyl and lauryl esters of acrylic, methacrylic and ethacrylic acids.

The amounts of comonomers used will vary depending on the particular application, but both the hardening and plasticizing comonomers may be used in amounts varying from 5% to 50% of the total copolymer weight.

If a substantially cross-linked polymer or copolymer is desired, a polyethylenically unsaturated polymerizable monomer can be added to monomer mixture prior to polymerization. Such polyethylenically unsaturated polymerizable monomers suitable as cross-linkers are well-known in the art and typical of such compounds are the polyvinyl aromatic hydrocarbons including divinylbenzene, trivinylbenzene, divinylnaphthalene; glycol diacrylates and dimethacrylates including ethylene glycol dimethacrylate; and ethers of polyhydric alcohols, such as divinoxyethane and trivinoxypropane. Depending on the intended use for the polymer, the amount of cross-linker will vary. The amount used is generally in the range of 1% to as high as 30% of the weight of the monomer mixture.

The monomers of this invention, alone or in admixture with other monoethylenically unsaturated polymerizable monomers as set forth hereinbefore, may be polymerized at ambient temperatures and pressures even without the aid of a polymerization catalyst. The polymerization is most suitably conducted, however, in the presence of a free-radical producing catalyst at temperatures of 25° C. to 125° C. The polymerization can be, for example, an organic or inorganic peroxide such as diethyl peroxide, di-tert-butyl peroxide, benzoyl peroxide, lauroyl peroxide, hydrogen peroxide, and the like; or it can be a salt of a peracid such as ammonium persulfate, sodium perborate, potassium percarbonate, and the like; or it can be one of the very active organic azo catalysts described in Hunt (U.S. Patent 2,471,959, such as alpha, alpha'-azobis(alpha-gamma-dimethyl-valeronitrile).

The polymers and copolymers of the present invention are of particular interest because they are plastic or elastomeric materials possessing outstanding chemical and thermal stability.

The following examples set forth certain well-defined embodiments of the application of this invention. They are not, however, to be considered as limitations thereof, since many modifications may be made without departing from the spirit and scope of this invention. Unless otherwise specified, all parts are parts by weight. All temperatures are centigrade unless otherwise noted.

Example I.—2,3-bis(difluoramino)propyl-N-methacryloyl carbamate

To a 100 ml. three-necked flask fitted with magnetic stirrer, condenser, thermometer and dropping funnel (all outlets covered with Drierite drying tubes) was introduced 3.24 grams (0.02 mole) 2,3-bis(difluoramino)propanol-1 and 40 ml. dry ligroin. After cooling to 0.5° C. with external ice-water bath, 2.0 grams (0.018 mole) methacryloyl isocyanate was added dropwise at such a rate that the temperature did not exceed 10° C. A white crystalline solid precipitated during this time. After one hour, the solid was collected by filtration and recrystallized from a methanol-water mixture to give 4.83 grams (97%), M.P. 96–97° C.

*Analysis.*—Calculated for $C_8H_{11}F_4N_3O_3$ (percent): C, 37.66; H, 4.53; F, 26.45; N, 14.62. Found: C, 37.91; H, 4.41; F, 26.69; N, 14.81.

Example II.—2,3-bis(difluoramino)propyl-N-acryloyl carbamate

To a solution of 3.34 grams (0.0205 mole) 2,3-bis(difluoramino)propanol-1 in 100 ml. dry ligroin contained in a 200 ml. three-necked flask fitted with magnetic stirrer, condenser, thermometer and dropping funnel (all outlets covered with Drierite drying tubes) cooled to 0.5° C. by an external ice-water bath was added dropwise 2.0 grams (0.0205 mole) acryloyl isocyanate at such a rate that the temperature did not exceed 10° C. A white crystalline solid precipitated during the addition of the isocyanate. Recrystallization of the solid from an ethanol-water mixture gave 2.54 grams (49%) of 2,3-bis(difluoramino) propyl-N-acryloyl carbamate.

*Analysis.*—Calculated for $C_7H_9F_4O_3$ (percent): C, 32.44; H, 3.47; F, 28.55; N, 16.22. Found: C, 32.64; H, 3.62; F, 28.25; N, 15.92.

Example III.—2,3-bis(difluoramino)ethyl-N-acryloyl carbamate

A reaction of 0.97 grams (0.014 mole) acryloyl isocyanate with 1.4 grams (0.0095 mole) 1,2-bis(difluoramino)ethanol in 25 ml. dry cholorform under conditions similar to those described above gave 0.79 gram of a white crystalline solid, M.P. 62–64° C. and 1.25 grams of a polymeric material. The infrared spectra of the two products were identical in every respect except the polymeric material showed no carbon-carbon double bond absorption at 3.2, 6.1, 7.5, or 8.0μ. Recrystallization of the white solid from methanol gave a product melting at 64–65° C.

*Analysis.*—Calculated for $C_6H_7F_4N_3O_3$ (percent): C, 29.35; H, 2.85; F, 30.95; N, 17.13. Found: C, 30.02; H, 2.60; F, 31.29; N, 16.86.

Example IV.—2,3-bis(difluoramino)propyl-N-vinyl carbamate

Under similar conditions, 3.9 grams (0.057 mole) vinyl-isocyanate was reacted with 9.23 grams (0.057 mole) vinyl isocyanate in 40 ml. dry ligroin to give a viscous oil. Attempts to recrystallize were unsuccessful. An infrared spectrum indicated the desired carbamate, although there was no carbon-carbon double bond absorption, and the product is a polymeric material.

Example V.—2,3-bis(difluoramino)-2-methyl-propyl-N-methacryloyl carbamate

In a similar manner, 4.56 grams of an oil was obtained from the reaction of 2.0 grams (0.018 mole) methacryloyl isocyanate with 3.52 grams (0.02 mole) 2,3-bis(difluoramino)-2-methyl propanol-1 in 50 ml. dry methylene chloride. Removal of the solvent yielded the oil. The infrared spectrum of the oil indicated the carbamate contaminated with a small quantity of alcohol.

*Analysis.*—Calculated for $C_9H_{12}F_4N_3O_3$ (percent): C, 37.65; H, 4.52; F, 26.45; N, 14.62. Found: C, 37.05; H, 5.16; F, 30.25; N, 15.92.

Example VI

Using the method set forth in Example III, an equivalent weight of ethacryloyl isocyanate was substituted for the acryloyl isocyanate, 2,3 - bis(difluoramino)ethyl-N-ethacryloyl carbamate was obtained in good yield.

Particularly if the reactions are conducted at elevated temperatures, and/or if the reaction time is prolonged, then it is preferred to use a polymerization inhibitor to prevent loss of product, and to prevent the formation of undesirable gums in the reaction equipment. As set forth in column 2 of this specification, such polymerization inhibitors are well-known and typical are hydroquinone, quinone, tert-butyl-catechol, etc. Diphenyl picrylhydrazyl was found to be particularly effective as a polymerization inhibitor. 0.05% to 0.2% on the weight of the reaction mixture is employed. The example given hereinbefore can be conducted in this manner.

I claim:

1. A monomer of the general formula $$R-NH-\overset{O}{\underset{\|}{C}}-OR^1$$

in which R is selected from the group consisting of vinyl, acryloyl, methacryloyl and ethacryloyl, and $R^1$ is selected from the group consisting of

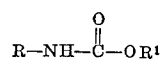

in which $n$ is an integer from 1 to 5,

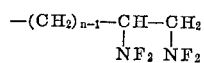

and

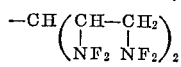

in which $R^2$ is selected from the group consisting of hydrogen and lower alkyl containing 1 to 4 carbon atoms and $R^3$ is selected from the group consisting of hydrogen and lower alkyl containing 1 to 4 carbon atoms.

2. Polymers of the compounds of claim 1.

3. A process for the preparation of the carbamates as set forth in claim 1 which comprises reacting at a temperature of −60° C. to 40° C. an isocyanate selected from the group consisting of vinyl isocyanate, acryloyl isocyanate, methacryloyl isocyanate, ethacryloyl isocyanate, with an alcohol selected from the group consisting of alcohols of the formula

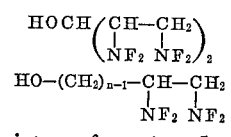

in which $n$ is an integer from 1 to 5, and

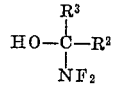

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

4. A process as set forth in claim 3 in which the reaction is carried out in a solvent which is inert under the reaction conditions.

5. A process as set forth in claim 3 in which solvent is selected from the group consisting of benzene, toluene, chloroform, methylene chloride and acetonitrile.

6. A process as set forth in claim 3 in which the reaction is carried out in the presence of a polymerization inhibitor.

7. A process as set forth in claim 3 in which the reaction is carried out in the presence of a polymerization inhibitor, said inhibitor is selected from the group consisting of hydroquinone, quinone, tert-butyl-catechol and diphenyl dipicrylhydrazyl.

8. Copolymers of the monomers of claim 1 with monoethylenically unsaturated compounds.

9. Copolymers of the monomers of claim 1 with polyethylenically unsaturated compounds.

10. Copolymers of the monomers of claim 1 with a polyethylenically unsaturated compound selected from the group consisting of divinylbenzene, trivinylbenzene, divinylnaphthalene, glycol diacrylates, glycol dimethacrylates, ethers of polyhydric alcohols, said polyethylenically unsaturated compound being present in an amount of 1% to 30% on the weight of the monomer mixture.

References Cited

Hoffman et al.: Chem. Reviews, vol. 62, pp. 12 to 18 (1962).

LELAND A. SEBASTIAN, *Primary Examiner.*

U.S. Cl. X.R.

260—80.3, 85.5, 85.7, 88.1, 89.7, 482, 584, 82.1